United States Patent [19]

Dilworth

[11] Patent Number: 4,720,183
[45] Date of Patent: Jan. 19, 1988

[54] EXTREME WIDE ANGLE EYEPIECE WITH MINIMAL ABERRATIONS

[75] Inventor: Donald C. Dilworth, Medford, Mass.

[73] Assignee: Optical Systems Design, Inc., East Booth Bay, Me.

[21] Appl. No.: 833,963

[22] Filed: Feb. 27, 1986

[51] Int. Cl.⁴ .............................................. G02B 25/00
[52] U.S. Cl. ............................................... 350/410
[58] Field of Search ........................................ 350/410

[56] References Cited

U.S. PATENT DOCUMENTS 3,384,434  5/1968  Scidmore et al. ................. 350/410
4,286,844  9/1981  Nagler ............................... 350/410

*Primary Examiner*—John K. Corbin
*Assistant Examiner*—Rebecca D. Gass
*Attorney, Agent, or Firm*—Wolf, Greenfield & Sacks

[57] ABSTRACT

A wide-angle eyepiece designed to cover a field of view of 90° with substantially perfect correction of spherical aberration, coma, astigmatism, field curvature, chromatic aberration, and spherical aberration of the exit pupil.

2 Claims, 6 Drawing Figures

EXTREME WIDE ANGLE EYEPIECE WITH MINIMAL ABERRATIONS

BACKGROUND OF THE INVENTION

This invention relates to eyepieces suitable for use with either astronomical or terrestrial telescopes, and more particularly to eyepieces having an extremely wide field of view with essentially perfect correction of all monochromatic and chromatic aberrations.

In the ideal case, an eyepiece should present to the eye of the observer a virtual image focused at a convenient distance (typically at a distance of one meter) with uniform sharpness of the image over the entire field of view. In addition, all of the ray bundles from objects in various parts of the field should, in the absence of the observer's eye, cross at a single point on the optical axis, said point being the exit pupil of the system. In addition, for maximum utilization of the observer's eye, the apparent field should be about 90° in extent.

In the prior art, these goals have substantially failed to be met for a variety of reasons. In eyepieces consisting wholly of lens elements located between the focal plane of the telescope and the observer, such as U.S. Pat. No. 3,384,434, the field of view is severely limited, in practical cases to about 60° to 70°, by the large amount of astigmatism inherent in those designs. In the case of U.S. Pat. No. 4,286,844, where a negative lens group is located on the far side of the focal plane from the observer, the astigmatism is better corrected and the design is capable of covering a field of about 90°—but in this case there is such a large amount of spherical aberration of the exit pupil that, for many applications, especially for daytime use when the iris of the user's eye is more constricted than at nighttime, it is impossible for light from all parts of the field of view to enter the user's eye at the same time. What the user sees is a wide field, portions of which are completely black while other portions are illuminated. As the user moves his or her eye from side-to-side, different portions of the field become alternately darkened and illuminated—but at no time is the whole field visible at once. This defect is known as the "kidney bean" effect, because the missing, darkened portions of the field are delimited by a boundary of roughly the shape of a kidney bean.

SUMMARY OF THE INVENTION

Accordingly, it is the object of the present invention to provide an extreme wide-angle eyepiece with negligable astigmatism, curvature of field, spherical aberration, coma, chromatic aberration, and spherical aberration of the exit pupil, thereby providing the user with an essentially perfect, wide-angle field of view.

It is a further object of this invention to provide an eyepiece which may be used at a relative aperture down to F/4.

It is still another object of the invention to provide an eyepiece covering a field of view of 90°, with an eye relief that is equal to or greater than the focal length.

It is still another object of the invention to provide an eyepiece that is corrected to such an extent that the monochromatic image, at a relative aperture of F/7, has no more than about a quarter-wave of optical path difference (OPD) error at a wavelength of 0.58756 micrometers over a field of view of approximately 90°.

It is a further object of the invention to provide an eyepiece that is corrected for field aberrations to such an extent that the sagittal and tangential field curves cross at no less than three different points in the field.

It is still another object of the invention to provide an eyepiece that, in one embodiment, has an amount of coma intentionally introduced to compensate for the amount of that aberration found in the common form of astronomical telescope consisting of a single paraboloidal primary mirror and optionally a flat folding mirror.

According to this invention, a wide-angle eyepiece is provided consisting of seven lenses, I, II, III, IV, V, VI, and VII, and a field stop P located between lenses IV and V, wherein lens I is a bi-concave lens, lens II is a meniscus lens with the strongest curve adjacent lens III, lens III is a bi-concave lens, lens IV is a meniscus lens with the strongest curve adjacent lens V, lens V is a lens with a convex surface adjacent lens VI and a surface adjacent lens IV within the range of slightly positive to slightly negative, lens VI is a bi-convex lens, and lens VII is a doublet comprising a bi-convex lens and a bi-concave lens with the bi-convex lens adjacent lens VI.

Features and advantages of the invention will become apparent from the foregoing and from the following specification of preferred embodiments of the invention.

DETAILED DESCRIPTION OF A PREFERRED EMBODIMENT

Figure 1:
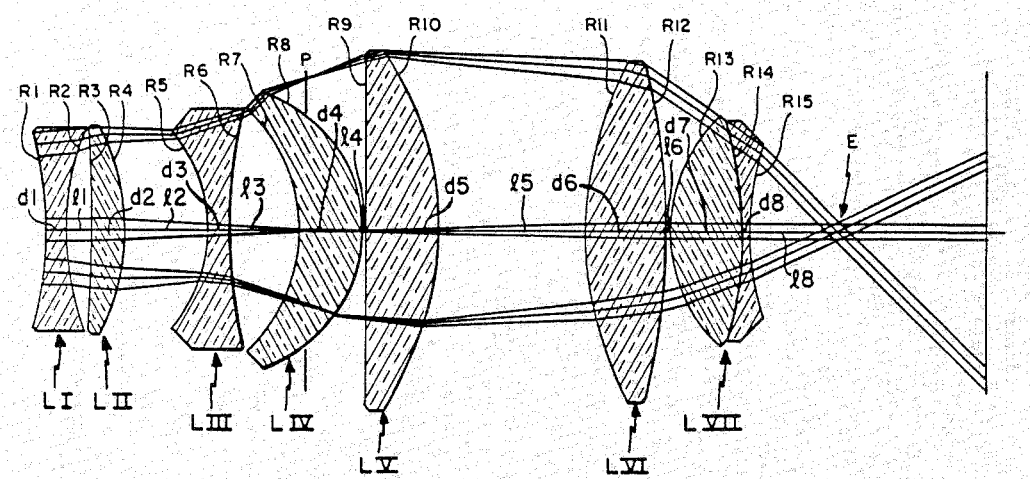
FIG. 1 is a schematic longitudinal section view (scale factor 1.000×) showing one arrangement of lens elements according to the present invention.
Figure 2:
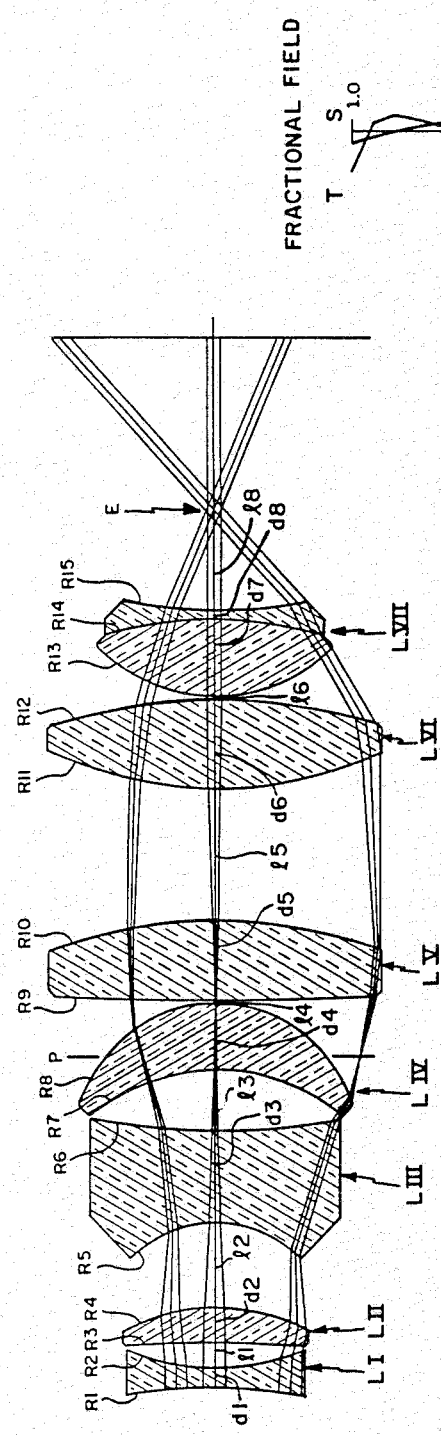
FIG. 2 is a schematic longitudinal section view (scale factor 1.000×) showing another embodiment of the eyepiece according to the present invention.

In FIG. 1, looking from left to right or from the objective lens to the viewer, lens LI is a bi-concave singlet having its surface of greater curvature adjacent lens LII. Lens LII is a positive meniscus singlet having its strongest curve adjacent lens LIII. Lens LIII is another bi-concave negative singlet, having its surface of greater curvature adjacent lens LII. Lens LIV is another positive meniscus singlet having its strongest curve adjacent lens LV. Lens LV is a lens with a convex surface adjacent lens LVI and a surface adjacent lens LIV which is nearly flat, and could be designed to be either slightly positive in curvature or slightly negative. Lens LVI is a bi-convex positive singlet, having its surface of greater curvature adjacent lens LV. Lens LVII is a cemented doublet consisting of a bi-convex positive lens and a bi-concave negative lens with the bi-convex lens adjacent lens LVI. The eyepiece has an internal focus, where a field stop P should be placed. The exit pupil of the system, shown at E, corresponds to the place where the observer's eye is to be located. In FIG. 2, the general arrangement is similar to that of FIG. 1, except that lens LIII is somewhat thicker and the design specifications have been modified so as to introduce the compensating coma discussed above.

The focal lengths of the individual eyepiece lens elements are as follows: the focal length of lens LI is between minus two and minus four times the total eyepiece focal length; the focal length of lens LII is between two and four times the eyepiece focal length; the focal length of lens LIII is between minus 1.5 and minus 2.5 times the eyepiece focal length; the focal length of lens LIV is between five and ten times the eyepiece focal length; the focal length of lens LV is between four and eight times the eyepiece focal length; the focal length of lens LVI is between three and five times the eyepiece focal length; the focal length of the positive member of lens LVII is between 1.5 and 2.5 times the eyepiece focal length; and the focal length of the negative member of lens LVII is between minus 1.5 and minus three times the eyepiece focal length.

The eyepiece has an internal field stop that lies between elements LIV and LV, at a position which, if projected perpendicularly toward the optical axis, would intersect the latter at a point about one-seventh of the distance from surface R7 to surface R8.

More specifically, the lens data for a FIG. 1 embodiment eyepiece with a 15.938 mm. focal length and a field of view of 90° are shown in Table I wherein lens radii of curvature, thicknesses, and axial separation distances are given in millimeters, n is the refractive index of a lens element, and v is the Abbe number for a lens element.

TABLE I

| Lens | Radii | Axial Thickness "d" | Lens Separation "l" | n | v |
|---|---|---|---|---|---|
| LI | R1 = −56.3118<br>R2 = +46.2614 | d1 = 3.39373 | | 1.53996 | 59.71 |
| | | | l1 = 4.1225 | | |
| LII | R3 = −221.1200<br>R4 = −33.9786 | d2 = 5.86885 | | 1.84666 | 23.83 |
| | | | l2 = 14.06033 | | |
| LIII | R5 = −23.38768<br>R6 = +83.8454 | d3 = 3.57986 | | 1.62004 | 36.37 |
| | | | l3 = 11.6589 | | |
| LIV | R7 = −26.7386<br>R8 = −23.4904 | d4 = 10.75047 | | 1.62041 | 60.32 |
| | | | l4 = 0.41 | | |
| LV | R9 = −4353.465<br>R10 = −50.5861 | d5 = 12.4375 | | 1.62041 | 60.32 |
| | | | l5 = 24.826 | | |
| LVI | R11 = +57.4022<br>R12 = −104.509 | d6 = 14.0534 | | 1.62041 | 60.32 |
| | | | l6 = 0.41 | | |
| LVII | R13 = +25.6419<br>R14 = −59.6482 | d7 = 12.152 | | 1.63854 | 55.42 |
| | R15 = +46.1346 | d8 = 1.294 | | 1.80518 | 25.43 |
| | | | l7 = 16.367 | | |

Figure 1A:
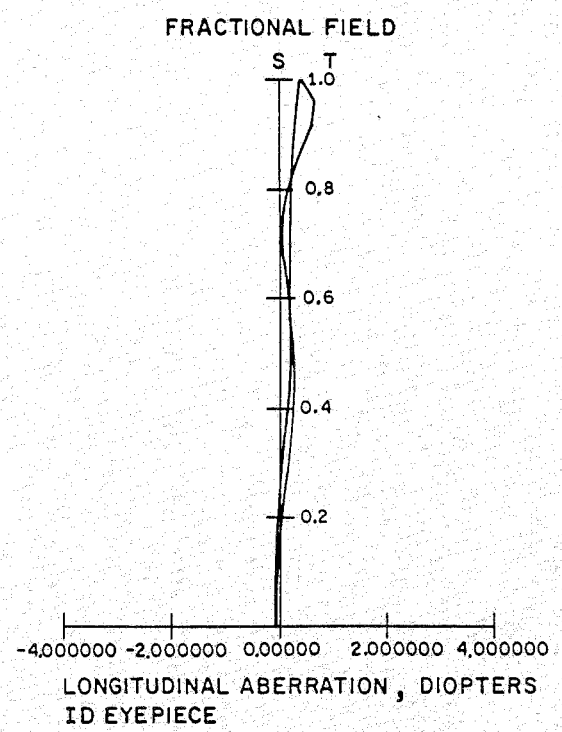
FIG. 1a is a plot of tangential and sagittal field curvatures over a total field of about 90° for the lens arrangement shown in FIG. 1.

An eyepiece having the lens data set forth in Table I has a field corrected so that the sagittal and tangential field curves cross at three different off-axis field points, as shown in FIG. 1a. The resulting residual OPD errors are less than about ¼ wave for a wavelength of 0.58756 micrometers over a field of view of 90° at a relative speed of F/7, and the eyepiece exhibits excellent performance at speeds as fast as F/4. The spherical aberration of the pupil is corrected (as shown at location "E" in FIG. 1) to such an extent that the observer can easily view the entire field of view with a single placement of his or her eye. The eye relief, given as length l7, is about 16.4 mm., which exceeds the focal length of the eyepiece.

The lens data for a FIG. 2 embodiment with a focal length of 15.695 mm. and an 85° field of view, designed to compensate for the coma of a paraboloidal primary mirror, are shown in Table II. The lens parameters are defined the same as those in Table I.

TABLE II

| Lens | Radii | Axial Thickness "d" | Lens Separation "l" | n | v |
|---|---|---|---|---|---|
| LI | R1 = −89.0778<br>R2 = +39.1137 | d1 = 3.39000 | | 1.53172 | 48.76 |
| | | | l1 = 4.2500 | | |
| LII | R3 = −178.1556<br>R4 = −32.29746 | d2 = 5.90193 | | 1.84666 | 23.83 |
| | | | l2 = 14.11468 | | |
| | R5 = −20.40000 | | | | |

TABLE II-continued

| Lens | Radii | Axial Thickness "d" | Lens Separation "l" | n | v |
|---|---|---|---|---|---|
| LIII | R6 = +107.1880 | d3 = 14.99428 | | 1.64769 | 33.85 |
| | | | l3 = 9.92191 | | |
| LIV | R7 = −34.4176<br>R8 = −24.3384 | d4 = 11.13354 | | 1.62041 | 60.32 |
| | | | l4 = 0.41 | | |
| LV | R9 = +540.000<br>R10 = −80.0000 | d5 = 13.2895 | | 1.62041 | 60.32 |
| | | | l5 = 21.8590 | | |
| LVI | R11 = +67.6658<br>R12 = −92.0000 | d6 = 14.6877 | | 1.62041 | 60.32 |
| | | | l6 = 0.41 | | |
| LVII | R13 = +28.17400<br>R14 = −61.5188<br>R15 = +80.0000 | d7 = 12.9568<br>d8 = 1.2900 | | 1.62041<br>1.84666 | 60.32<br>23.83 |
| | | | l7 = 18.0903 | | |

Figure 2A:
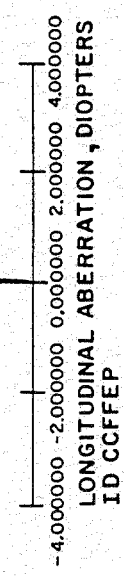
FIG. 2a is a plot of the tangential and sagittal field curvatures over a total field of about 85° for the second embodiment shown in FIG. 2. This embodiment is intended to compensate for the coma of a paraboloidal primary mirror.

It is to be noticed in reference to FIG. 2 and FIG. 2a that this embodiment is also extremely well corrected for field aberrations and for pupil aberrations. The sagittal and tangential field curves cross at three discrete field angles, and the exit pupil is essentially free from spherical aberration, thus completely eliminating the "kidney-bean" effect. The eye relief of this embodiment, given as length l7, exceeds the focal length of the eyepiece.

Figures 3, 3A:
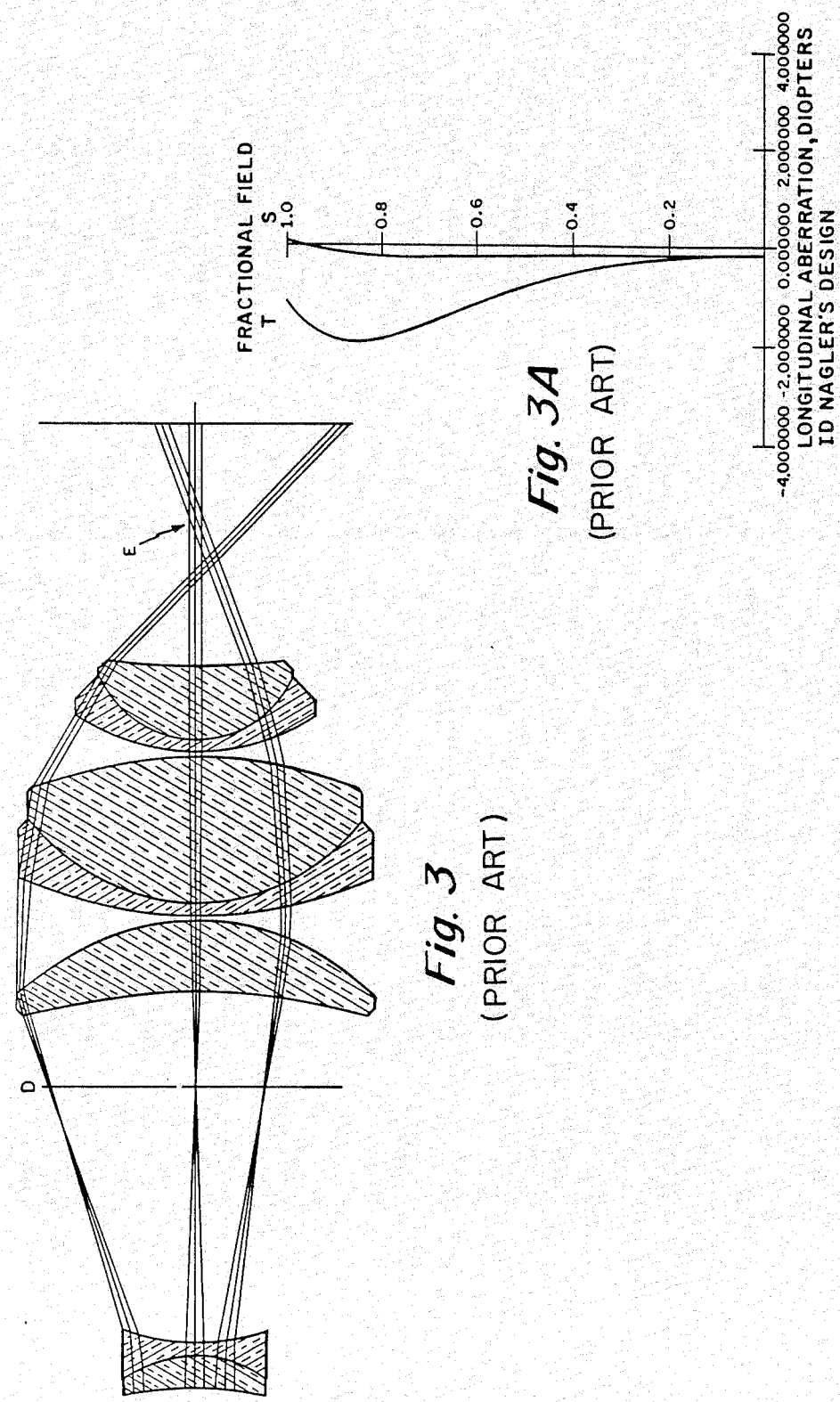
FIG. 3 is a schematic longitudinal section view (scale factor 1.000×) showing an example of the prior art as regards pupil aberration correction. This example is from U.S. Pat. No. 4,286,844.
FIG. 3a is a plot of the tangential and sagittal field curvatures over a total of about 90° for the prior-art lens arrangement shown in FIG. 3.

It is also to be noticed in reference to FIGS. 1 and 2 that the diameter of the beam emerging from the eyepiece at the widest field angle exceeds the diameter emerging from the on-axis object. This condition is desirable in wide-angle eyepieces because it leads to a reduction in apparent visual field distortion. In the case of the prior-art eyepiece shown in FIG. 3, taken from U.S. Pat. No. 4,286,844 where the internal focal plane is located at D and the exit pupil at E, the widest-angle beam is smaller in diameter than the on-axis beam, and the distortion in that eyepiece is considerable.

The lens elements need not be made of expensive or special glasses but rather are made from common, ordinary optical glass.

Having thus described the invention, it is to be understood that the specifications and drawings are to be interpreted as illustrative and not in a limiting sense.

What is claimed is:

1. A wide-angle eyepiece comprising seven lenses, I, II, III, IV, V, VI, and VII, and a field stop P located between lenses IV and V, wherein lens I is a bi-concave lens, lens II is a meniscus lens with the strongest curve adjacent lens III, lens III is a bi-concave lens, lens IV is a meniscus lens with the strongest curve adjacent lens V, lens V is a lens with a convex surface adjacent lens VI and a surface adjacent lens IV within the range of slightly positive to slightly negative, lens VI is a bi-convex lens, and lens VII is a doublet comprising a bi-convex lens and a bi-concave lens with the bi-convex lens adjacent lens VI, said lenses having parameters substantially as set forth in the following table wherein lens curvatures, lens thicknesses, and lens separation distances are given in millimeters, n is the index of refraction of a lens element, and v is the Abbe number of a lens element:

| Lens | Radii | Axial Thickness "d" | Lens Separation "l" | n | v |
|---|---|---|---|---|---|
| LI | R1 = −56.3118<br>R2 = +46.2614 | d1 = 3.39373 | | 1.53996 | 59.71 |
| | | | l1 = 4.1225 | | |
| LII | R3 = −221.1200<br>R4 = −33.9786 | d2 = 5.86885 | | 1.84666 | 23.83 |
| | | | l2 = 14.06033 | | |
| LIII | R5 = −23.38768<br>R6 = +83.8454 | d3 = 3.57986 | | 1.62004 | 36.37 |
| | | | l3 = 11.6589 | | |
| LIV | R7 = −26.7386<br>R8 = −23.4904 | d4 = 10.75047 | | 1.62041 | 60.32 |
| | | | l4 = 0.41 | | |
| LV | R9 = −4353.465<br>R10 = −50.5861 | d5 = 12.4375 | | 1.62041 | 60.32 |
| | | | l5 = 24.826 | | |
| LVI | R11 = +57.4022<br>R12 = −104.509 | d6 = 14.0534 | | 1.62041 | 60.32 |
| | | | l6 = 0.41 | | |
| LVII | R13 = +25.6419<br>R14 = −59.6482<br>R15 = +46.1346 | d7 = 12.152<br>d8 = 1.294 | | 1.63854<br>1.80518 | 55.42<br>25.43 |
| | | | l7 = 16.367 | | |

2. A wide-angle eyepiece comprising seven lenses, I, II, III, IV, V, VI, and VII, and a field stop P located between lens IV and V, wherein lens I is a bi-concave lens, lens II is a meniscus lens with the strongest curve adjacent lens III, lens III is a bi-concave lens, lens IV is a meniscus lens with the strongest curve adjacent lens V, lens V is a lens with a convex surface adjacent lens VI and a surface adjacent lens IV within the range of slightly positive to slightly negative, lens VI is a bi-convex lens, and lens VII is a doublet comprising a bi-convex lens and a bi-concave lens with the bi-convex lens adjacent lens VI, said lenses having parameters substantially as set forth in the following table wherein lens curvatures, lens thicknesses, and lens separation distances are given in millimeters, n is the index of refraction of a lens element, and v is the Abbe number of a lens element:

| Lens | Radii | Axial Thickness "d" | Lens Separation "l" | n | v |
|---|---|---|---|---|---|
| LI | R1 = −89.0778<br>R2 = +39.1137 | d1 = 3.39000 | | 1.53172 | 48.76 |
| | | | l1 = 4.2500 | | |
| LII | R3 = −178.1556<br>R4 = −32.29746 | d2 = 5.90193 | | 1.84666 | 23.83 |
| | | | l2 = 14.11468 | | |
| LIII | R5 = −20.40000<br>R6 = +107.1880 | d3 = 14.99428 | | 1.64769 | 33.85 |
| | | | l3 = 9.92191 | | |
| LIV | R7 = −34.4176<br>R8 = −24.3384 | d4 = 11.13354 | | 1.62041 | 60.32 |
| | | | l4 = 0.41 | | |
| LV | R9 = +540.000<br>R10 = −80.0000 | d5 = 13.2895 | | 1.62041 | 60.32 |
| | | | l5 = 21.8590 | | |
| LVI | R11 = +67.6658<br>R12 = −92.0000 | d6 = 14.6877 | | 1.62041 | 60.32 |
| | | | l6 = 0.41 | | |
| LVII | R13 = +28.17400<br>R14 = −61.5188<br>R15 = +80.0000 | d7 = 12.9568<br>d8 = 1.2900 | | 1.62041<br>1.84666 | 60.32<br>23.83 |
| | | | l7 = 18.0903 | | |

* * * * *